United States Patent Office 3,338,861
Patented Aug. 29, 1967

3,338,861
POLYURETHANES BASED ON HYDROXYL-TERMINATED POLYDIENES
Thomas G. Mastin and Emanuel Schoenberg, Akron, Ohio, assignors to The Goodyear Tire & Rubber Company, Akron, Ohio, a corporation of Ohio
No Drawing. Filed Mar. 30, 1964, Ser. No. 355,893
10 Claims. (Cl. 260—33.6)

This application is a continuation-in-part of our application Ser. No. 9,208, filed Feb. 17, 1960, and now abandoned.

This invention relates to a hydrocarbon extended or plasticized polyurethane elastomeric composition and to a method for preparing said composition. More particularly, this invention relates to a polyurethane elastomeric composition comprising at least 50 parts of a hydrocarbon type extender or plasticizer for each 100 parts of a polyurethane elastomer formed by the chain extension of a hydroxyl-terminated polymeric product of a conjugated diolefin with an organic polyisocyanate.

Although polyurethane elastomers have excellent physical properties for most purposes, they are very expensive. The high price of these materials materially limits the commercial use of polyurethanes. Consequently rubber technologists have attempted frequently to use less expensive materials to blend with the polyurethane elastomers to reduce its cost and still obtain physical properties satisfactory for a particular use. For example, rubber technologists have attempted to extend or plasticize polyurethane elastomers with the relatively cheap hydrocarbon oils obtained from petroleum or other sources, but unfortunately only a very small amount of a hydrocarbon type extender oil is compatible with the conventional polyurethane elastomer. Consequently, when this amount of oil was exceeded, the hydrocarbon plasticizer or extender would exude from the polyurethane elastomer. The plasticized composition also exhibited other defects which limited its usefulness. To the best of applicant's knowledge, about 20% of extender oil is the most that has ever been used in polyurethane rubber, and in this particular case a special polyurethane elastomer was required and a very special kind of extender oil was needed.

Since it is realized by rubber technologists that the use of extender or plasticizer oils results in the compounded rubber having less desirable physical properties, it is desirable to be able to use a reinforcing agent, such as carbon black, to compensate for the reduction in tensile strength, modulus and related physical properties of the uncompounded rubber. With polyurethane elastomers it is the usual experience that the addition of reinforcing agents, such as carbon black, has no appreciable beneficial effect on the physical properties of the carbon black containing rubber.

Therefore, a principal object of this invention is to provide a polyurethane elastomer which may be compounded with appreciable quantities of a hydrocarbon type extender or plasticizer without the composition exhibiting signs of incompatibility. Another object of this invention is to provide a polyurethane elastomer which may be compounded with carbon black to obtain an appreciable improvement in the physical properties of the compounded polyurethane elastomer. A further object of this invention is to provide a useful polyurethane elastomeric composition having a lower per pound cost than the presently available polyurethanes and yet still being castable and processible in the customary manner. A still further object of this invention is to provide a more economical polyurethane product suitable for special uses such as rocket fuel binders and the preparation of neutron shields, i.e. those uses where a cheap castable elastomeric material is particularly desirable. Still another object of this invention is to provide a polyurethane elastomeric composition which may contain either a hydrocarbon type plasticizer or extender oil and/or carbon black but which is sulfur curable. Other objects of this invention will be apparent from the following description.

The objects of this invention may be accomplished by the preparation of a polyurethane elastomeric composition comprising (1) the reaction product of a polyalkadiene diol of about 700 to 12,000 molecular weight with an equivalent amount or a slight excess of an organic polyisocyanate in admixture with (2) a hydrocarbon type extender or plasticizer material. The elastomeric composition of this invention may be obtained by adding the hydrocarbon type plasticizer or extender oil with or without a filler to at least one of the reactants prior to the formation of the polyurethane, or alternatively, the hydrocarbon type extender or plasticizer oil may be added to the polyurethane elastomer on the mill while the elastomer is still in a processible condition. In a representative and preferred embodiment of this invention the hydrocarbon extender oil with or without carbon black is added to the polyalkadiene diol prior to its reaction with the organic polyisocyanate. Since the hydrocarbon type extender oil is compatible with the polyalkadiene diols, its incorporation with the polyalkadiene diol permits the reactants to be more readily incorporated than where the hydrocarbon type extender or plasticizer is added to the organic polyisocyanate. A further reason for this preference is that the addition of the hydrocarbon type extender oil to the polyalkadiene diol prior to its reaction with the organic polyisocyanate yields an elastomeric composition or masterbatch, without the need for milling the polyurethane product in order to incorporate the extender oil into the rubber. An alternative means for producing the polyurethane elastomers of this invention is to convert the polyalkadiene diol to its bis chloroformate by phosgenation and to extend the bis chloroformate to the elastomeric polyurethane with an aqueous dispersion of either a primary or a secondary diamine in the so-called chain extension reaction. The concentration and amount of the aqueous dispersion of primary or secondary diamine should be adjusted to give at least one mol of diamine for each mole of bis chloroformate present. In this method, as in the polyisocyanate method, for producing polyurethane elastomers the extender oil and the reinforcing agent may be added to the reactants prior to their reaction or they may be incorporated by milling after the elastomer has been formed.

The polyalkadiene diols or hydroxyl-terminated polyalkadienes useful in this invention may be made by polymerizing conjugated alkadienes of 4 to 8 carbon atoms with lithium metal to obtain a polymeric product of the desired molecular weight and then the polymeric product is hydroxyl-terminated by treatment with a suitable terminating agent, such as ethylene oxide, propylene oxide, formaldehyde, etc.

In general, finely divided lithium metal, such as a sand or paste dispersed in tetrahydrofuran, for example, is used to polymerize the diene to yield a polymeric diene lithium adduct. The dispersion of the lithium metal is cooled to below 0° C. and preferably below −20° C. and sufficient alkadiene, for example, butadiene or isoprene, is slowly passed into the agitating lithium dispersion. When the polymeric product has the desired molecular weight, ethylene oxide or another terminating agent is passed into the reaction mixture to hydroxyl-terminate said polymeric product. The unreacted alkali metal is destroyed by reaction with a suitable alcohol, such as methanol, and water. By using this procedure polyalkylene diols having molecular weights from about 700 to 12,000 may be obtained, with the preferred materials having a molecular weight of about 1000 to 3000. The polyalkadiene diols prepared in this manner will have about one double bond for each 50 to 100 units of molecular weight.

If it is so desired, the polyalkadiene diol may be hydrogenated to satisfy part of the unsaturation or all thereof, i.e., prepare the polyalkylene diols, and these hydrogenated products may be used to produce polyurethane elastomers within the scope of this invention; but if the hydrogenation is sufficiently severe to satisfy all the unsaturation, the resulting elastomers will not be sulfur curable. For an elastomer to be sulfur curable, it is generally preferred that it contain at least one double bond for each 1000 to 3000 units of molecular weight although some rubber technologists consider some elastomers to be sulfur curable when they contain only one double bond for each 6000 to 7000 units of molecular weight.

Any of a wide variety of organic diisocyanates may be employed in the chain extension reaction with the polymeric diene diol or alkylene diol including aromatic, aliphatic and cycloaliphatic diisocyanates and combinations of these types. Representative compounds include 2,4-tolylene diisocyanate, 2,6-tolylene diisocyanate, m-phenylene diisocyanate, 4-chloro-1,3 phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene, diisocyanates, i.e., those in which each of the two isocyanate groups is attached directly to an aromatic ring, are preferred. In general, they react more rapidly with the long chain bifunctional compounds than do the alkylene diisocyanates. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanato-aryl) ureas such as di(3-isocyanato-4-methylphenyl) urea, may be used. The diisocyanates may also be used in the form of their reaction products with phenols and with related mercapto compounds, which reaction products regenerate the diisocyanate on heating.

The amount of polyisocyanate used should be at least equivalent on a mol for mol basis with the hydroxyl terminated hydrocarbon and preferably the range is 1.1 to 2.0 mol for each mol of the hydroxyl polymer.

The physical properties of the polyurethane can be enhanced by reacting the excess polyisocyanate with a crosslinking agent of the diamine, glycol and amino alcohols type. Representative examples are the monomeric glycols having 2 to 10 carbon atoms with butane diol being preferred, ortho dichlorobenzidine, methylene dianiline, 2-methyl-2-amino-propanol, dianisidine, hexamethylene diamine.

The nature of the hydrocarbon type extender or plasticizer oils usable in this invention may be divided into the following groups of oils: those primarily aromatic in nature having a Saybolt Universal viscosity at 210° F. of about 50 to 500 seconds; those primarily paraffinic in nature having a Saybolt Universal viscosity of 30 to about 500 seconds; those primarily naphthenic in nature having a Saybolt Universal viscosity at 210° F. of about 50 to about 500 seconds; and the asphaltic oils having a Saybolt Universal viscosity at 210° F. of at least about 500. Normally, those oils having a viscosity index less than about 30 are preferred over the paraffinic oils. The exact nature of these extender or plasticizer oils are well known and described in the prior art. These oils are available commercially from the various oil companies under various proprietary names and are normally derived from crude oils by fractionation of the crude into select fractions and solvent extracting or otherwise processing said fractions to obtain the desired material exhibiting the viscosity properties enumerated above. The exact nature and physical properties of some of the more readily available commercial extender oils useful in this invention are described in the article appearing in "Rubber Age," volume 70, No. 6, pp. 735–747, March 1952.

The amount of extender oil acceptable in this invention may vary from about 50 parts per 100 parts of elastomer to as high as 300, 400, or more parts per 100 parts of elastomer; the amount of extender oil used is determined primarily by the physical properties desired in the final product and the cost desired for said product. For example, if the oil-extended product is to be used as a binder in rocket fuels, the percent extender oil will be determined by the physical properties required to bind the rocket fuel in a stable condition and still give it acceptable burning properties. In this case the extender oil would serve not only to plasticize the rubber but also would serve as fuel for the rocket. On the other hand, if the elastomeric product is to be used for a neutron shield material, or a binder for said shield material, a high percentage of relatively paraffinic extender oil would be desirable, since in neutron shields a high hydrogen density is desirable. In some specific uses, for instance, the preparation of a neutron shield, it would be desirable to use a low molecular weight, semi-fluid or liquid polyethylene or polypropylene as the extender oil rather than one of the products available and normally used as extenders in the production of tires.

The polyurethane elastomers useful in this invention in addition to being compatible with appreciable quantities of extender plasticizer oil may also be compounded with carbon black to obtain an elastomeric composition having improved physical properties. The carbon black may be compounded into the polyurethane elastomer prior to the time the oil is added thereto to obtain an elastomeric composition having improved physical properties. On the other hand, the carbon black may be added to the oil extended or plasticized elastomeric composition and still obtain some or all of the aforesaid improvement in physical properties. In general, it is preferred to incorporate carbon black into the elastomer, which may contain oil, on the Banbury, or by any other suitable milling operation. As little as 5 parts and as much as 100 parts of carbon black per 100 parts of elastomer may also be used but, in general, it is preferred to use about 20 to 50 parts of carbon black per 100 parts of elastomer to obtain the optimum reinforcing of these elastomers. Any of the many carbon blacks available commercially may be used. The particular type carbon black selected will normally be made on the basis of the ultimate use to be made of the elastomeric composition. For example, if the elastomeric composition is to be used in the preparation of a cast rocket fuel then the carbon black used would be one which exhibited good burning characteristics with the particular oxidants used in said fuel. Also, the silica fillers may be used in place of the carbon blacks where light stocks are desired or in conjunction with them.

The process of this invention is illustrated by the following examples in which part are by weight unless otherwise indicated:

*Example 1.—Preparation of polyisoprene diol*

Finely divided lithium metal (1.3 parts) was dispersed in tetrahydrofuran (1500 parts). This mixture was cooled to −28° C. and 348 parts of isoprene were added slowly to the lithium dispersion over a period of 5 hours while maintaining the temperature below −28° C. After the addition of the last of the isoprene, 60 parts of ethylene oxide were added to the isoprene lithium reaction product. After about 1 hour, 120 parts of methyl alcohol were added slowly to the stirring mixture. This alcohol treatment was followed by the addition of about 1 liter of water. On standing, an organic layer separated above the water layer. The layers were separated and the organic layer was acidified with dilute HCl. The acidified organic layer was water washed and the diol recovered by evaporating the solvents from the organic portion.

*Example 2*

Polybutadiene diols having molecular weights of about 1000 to 3000 were made in accordance with the procedure of Example 1 by substituting butadiene for isoprene and using different amounts of butadiene relative to the amount of alkali metal used.

*Example 3*

A mixture consisting of 3200 parts of the polyisoprene diol made in Example 1 and 1600 parts of Circosol 2XH was made. To this mixture 200 parts of methylene bis (4-phenyl) isocyanate were added and allowed to react for a short time at about 80° C. The semi-fluid polyurethane reaction product was baked at 80° C. for 42 hours. This baked product was compounded on a mill using the curing recipe listed below to give an oil extended gum stock.

| | Parts |
|---|---|
| Elastomer | 100 |
| Stearic acid | 1.5 |
| Zinc oxide | 3 |
| Mercaptobenzothiazole | 2 |
| Diphenyl guanidine | 0.13 |
| Sulfur | 2 |

Another 100 parts of this same elastomer was compounded with the above recipe except 50 parts high abrasion furnace black was added on the Banbury and cured to give an oil extended black stock. These two stocks were sheeted. Different samples were cut from the sheet and cured at 290° F. for varying lengths of time. Table 1 shows the physical tests obtained on these cured stocks. It will be noted that the use of 50 parts of carbon black appreciably enhanced the physical properties of the oil extended elastomeric composition.

Circosol 2XH is a naphthenic type extender oil and its specific physical properties are described in the Rubber Abe article, supra.

*Example 5*

The same polybutadiene diol used in Example 4 (8.4 parts) was mixed with 6.5 parts of an aromatic type extender oil. This mixture was reacted with 2.1 parts of toluene 2,4-diisocyanate. After the reaction had proceeded for about one-half hour, 0.9 part of 4,4'-methylene bis 2-chloroaniline was added to the reacting mixture. The resulting mixture was cast as a gear and baked for 16 hours. This oil extended rubbery product exhibited no tendencies to bleed or separate the oil from the elastomer and appeared to be of uniform consistency throughout when compared with the product of Example 4. The resulting cast product was a serviceable gear.

*Example 6*

The same polybutadiene diol used in Example 4 (4.9 parts) and 4.7 parts of Circosol 2XH were mixed and reacted with 1.2 parts of toluene 2,4-diisocyanate. After the mixture had reacted for about 20 minutes at about 80° C., one half part of 4,4'-methylene bis 2-chloroaniline was added and incorporated therein. This reaction mixture was cast into a tensile strip mold and baked at 105° C. for 20 hours. The physical tests on the baked strip are as follows:

| Modulus, p.s.i. | | Tensile, p.s.i. | Elongation at Break, p.s.i. | Gehman Torsion Flex Test (° C.) | | |
|---|---|---|---|---|---|---|
| 100% | 300% | | | T-5 | T-10 | T-100 |
| 358 | 667 | 729 | 335 | -4 | -9 | -30 |

The Gehman Torsion Flex test properties on the polyurethane gum stock free of oil is normally higher than the oil extended elastomer. Oil extension improves the low temperature properties of the polyurethane elastomer.

*Example 7*

A polyurethane elastomer was prepared by reacting 640 parts of the polyisoprene diol of Example 1 with 41 parts of methylene bis (4-phenyl) isocyanate. This reaction product was baked at 80° C. for several hours and then half of the baked product or gum stock was

TABLE 1

| Oil Extended Polyurethane Elastomer | Cured, 290° F., Time, Min. | Moduli, p.s.i.[1] | | Tensile, p.s.i.[1] | Elongation, percent | Hardness Shore A |
|---|---|---|---|---|---|---|
| | | 100% | 300% | | | |
| Gum Stock | 30 | 44 | 100 | 281 | 565 | 31 |
| | 60 | 47 | 135 | 321 | 500 | 36 |
| | 120 | 44 | 123 | 275 | 445 | 36 |
| Black Stock | 30 | 239 | -------- | 433 | 265 | 58 |
| | 60 | 333 | -------- | 618 | 285 | 61 |
| | 120 | 300 | -------- | 590 | 300 | 63 |

[1] P.s.i. is pounds per square inch.

*Example 4*

Nine parts of a polybutadiene diol having a molecular weight of 1090 were reacted with 2.3 parts of toluene 2,4-diisocyanate at 80° C. for a few minutes, then 1 part of a cross-linking agent, 4,4'-methylene bis 2-chloroaniline, was incorporated in the reaction mixture and the reaction mixture was baked at 104° C. for 16 hours. This produced a tough elastomeric product.

compounded on the Banbury with a sulfur curing recipe of the following formulation:

| | Parts |
|---|---|
| Gum stock | 100 |
| Stearic acid | 1.5 |
| Zinc oxide | 3 |
| Mercaptobenzothiazole | 2 |
| Diphenyl guanidine | 0.13 |
| Sulfur | 2 |

The other half of the gum stock was compounded on the Banbury with the same formulation except 50 parts of high abrasion furnace black was incorporated on the mill. These compounded gum stocks were divided into individual samples and cured at 290° F. for varying lengths of time. The physical tests on these cured stocks are shown in Table 2. It should be noted that the incorporation of carbon black in the gum stock results in appreciable improvement in the tensile strength of the polyurethane elastomer or black stock.

TABLE 2

| Oil Extended Polyurethane Elastomer | Cured, 290° F., Time, Min. | Moduli, p.s.i. 100— | Moduli, p.s.i. 300— | Tensile, p.s.i. | Elongation, percent | Hardness Shore A |
|---|---|---|---|---|---|---|
| Gum Stock | 30 | 512 |  | 1,727 | 300 | 64 |
|  | 60 | 627 |  | 1,765 | 300 | 91 |
|  | 120 | 780 |  | 1,742 | 270 | 94 |
| Black Stock | 30 |  |  | 2,371 | 85 | 72 |
|  | 60 |  |  | 2,447 | 85 | 99 |
|  | 120 |  |  | 2,608 | 70 | 99 |

*Example 8*

A carbon black extender oil mixture was made by mixing 219 parts of a naphthenic extended oil with 240 parts of a carbon black. This mixture was a paste and essentially non-fluid in nature. Three hundred parts of the oil carbon black mixture was mixed with 190 parts of a butane diol formed by polymerizing butadiene with lithium and then hydroxyl terminating by reacting the butadiene lithium adduct with ethylene oxide. To this mixture of diol oil and carbon black 20 parts of toluene diisocyanate was added and thoroughly mixed and the resulting mixture was placed in a 110° C. oven for 45 minutes with stirring at 5 to 10-minute intervals. At the end of the 45 minute heating period 9.1 parts of methylene bis ortho chloroaniline was added to the mixture and intimately mixed before being placed in the oven at 110° C. for 18 hours. At the end of the 18-hour heating period the mixture was removed from the oven and found to be a rubbery material having a Shore A hardness of 51.

While certain representative embodiments and details have been shown for the purpose of illustrating the invention, it will be apparent to those skilled in this art that various changes and modifications may be made therein without departing from the spirit or scope of the invention.

What is claimed is:

1. A method of making an ab initio oil extended polyurethane comprising forming a reaction mixture of
   (1) at least 5 parts of an extender oil;
   (2) a hundred parts of hydroxyl terminated hydrocarbon having a molecular weight of at least 700 to no more than about 12,000; with
   (3) at least a stoichiometric amount of an organic polyisocyanate; and reacting said mixture to form a polyurethane, said hydroxyl terminated hydrocarbon being a polymer of a conjugated alpha diene having 4 to 8 carbon atoms which have been terminated with hydroxyl groups furnished by a terminating agent selected from the class consisting of ethylene oxide, propylene oxide and formaldehyde.

2. The method of claim 1 wherein at least 1.1 to about 2.0 mols of the polyisocyanate is used for each mol of hydroxyl terminated hydrocarbon.

3. The method of claim 2 wherein a crosslinking agent selected from the class of diamines, glycols having 2 to 10 carbon atoms and amino alcohols is added in amount of about 0.1 to about 0.9 mols per mol of hydroxyl terminated hydrocarbon prior to the setting of the reaction mixture.

4. The method of claim 1 wherein the reaction mixture contains at least 5 parts of a filler selected from the class consisting of the carbon blacks and silica fillers for each 100 parts of hydroxyl terminated hydrocarbon.

5. The method of claim 1 wherein the extender oil is selected from the class consisting of the liquid polyethylenes and the liquid polypropylenes.

6. A masterbatch of unmasticated polyurethane elastomer comprising (1) the reaction product of a hydroxyl-terminated polymeric product of a conjugated diolefinic compound of 4 to 8 carbon atoms with an organic polyisocyanate and (2) at least about 50 parts of a hydrocarbon plasticizer oil for each 100 parts of said reaction product, said hydroxyl terminated hydrocarbon being a polymer of a conjugated alpha diene having 4 to 8 carbon atoms which have been terminated with hydroxyl groups furnished by a terminating agent selected from the class consisting of ethylene oxide, propylene oxide and formaldehyde.

7. The composition of claim 6 wherein the hydrocarbon plasticizer oil has a Saybolt Universal viscosity at 210° F. of at least about 50 seconds and no more than about 500 seconds and a viscosity index less than about 30.

8. The composition of claim 6 wherein the composition contains at least 5 parts and no more than about 100 parts of carbon black for each 100 parts of elastomer.

9. The product of claim 6 wherein the plasticizer oil is selected from the class consisting of the liquid polyethylene and liquid polypropylene.

10. An oil extended polyurethane comprising the reaction product of an admixture of
    (1) at least 5 parts of an extender oil;
    (2) a hundred parts of a hydroxyl terminated hydrocarbon having a molecular weight of at least about 700 to no more than about 12,000; and
    (3) with at least a stoichiometric amount of an organic polyisocyanate, said hydroxyl terminated hydrocarbon being a polymer of a conjugated alpha diene having 4 to 8 carbon atoms which have been terminated with hydroxyl groups furnished by a terminating agent selected from the class consisting of ethylene oxide, propylene oxide and formaldehyde.

References Cited

UNITED STATES PATENTS

| | | | |
|---|---|---|---|
| 2,877,212 | 3/1959 | Seligman | 260—2.5 X |
| 2,964,083 | 12/1960 | Pfau et al. | 260—33.6 |
| 3,070,579 | 12/1962 | Szuare | 260—93.5 |
| 3,084,141 | 4/1963 | Kraus et al. | 260—94.7 |
| 3,102,875 | 9/1963 | Heiss | 260—33.6 |
| 3,136,732 | 6/1964 | Kaestner et al. | 260—33.6 |
| 3,175,997 | 3/1965 | Hsieh | 260—94.7 |

JULIUS FROME, *Primary Examiner.*

A. H. KOECKERT, B. A. AMERNICK,
*Assistant Examiners.*